United States Patent
Betz et al.

(10) Patent No.: US 11,338,731 B2
(45) Date of Patent: May 24, 2022

(54) COLOR SELECTION FOR AMBIENT LIGHTING OF A VEHICLE

(71) Applicant: DAIMLER AG, Stuttgart (DE)

(72) Inventors: Daniel Betz, Rottenburg-Seebronn (DE); Sebastian Schüler, Pforzheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/259,096

(22) PCT Filed: Jun. 27, 2019

(86) PCT No.: PCT/EP2019/067134
§ 371 (c)(1),
(2) Date: Jan. 8, 2021

(87) PCT Pub. No.: WO2020/011545
PCT Pub. Date: Jan. 16, 2020

(65) Prior Publication Data
US 2021/0316659 A1    Oct. 14, 2021

(30) Foreign Application Priority Data

Jul. 11, 2018   (DE) .................. 10 2018 005 476.5

(51) Int. Cl.
*B60Q 3/85*     (2017.01)
*H05B 45/20*    (2020.01)
(Continued)

(52) U.S. Cl.
CPC ............. *B60Q 3/85* (2017.02); *B60K 37/06* (2013.01); *B60Q 3/78* (2017.02); *H05B 45/20* (2020.01); *B60K 2370/143* (2019.05)

(58) Field of Classification Search
None
See application file for complete search history.

(56) References Cited

U.S. PATENT DOCUMENTS

| 2014/0140088 A1 | 5/2014 | Griebel |
| 2018/0326900 A1 | 11/2018 | Chen et al. |
| 2019/0118653 A1 | 4/2019 | Betz et al. |

FOREIGN PATENT DOCUMENTS

| DE | 102005013344 A1 * | 9/2006 | ............. B60Q 3/001 |
| DE | 102005013344 A1 | 9/2006 | |

(Continued)

OTHER PUBLICATIONS

International Search Report dated Sep. 19, 2019 in related/corresponding International Application No. PCT/EP2019/067134.

(Continued)

*Primary Examiner* — Dedei K Hammond
(74) *Attorney, Agent, or Firm* — Patent Portfolio Builders PLLC

(57) ABSTRACT

A device for controlling ambient lighting of a vehicle includes a light element in a vehicle interior, a touch-sensitive display unit, and a control unit. The light element emits light in one of a plurality of colors that can be generated by the light element. The display unit displays a plurality of colors of a predefined color spectrum simultaneously in a color scale, and detects a location of a user input made by touching the display unit. Via the detected location, the user input is assigned to an associated color displayed in the color scale and information about the color assigned to the user input is transmitted to the control unit, which controls the light element for emitting light in the color assigned to the user input. The light element and display unit have the same color space, such that the color associated with the user input, displayed on the display unit are the same.

8 Claims, 3 Drawing Sheets

Figure 1:
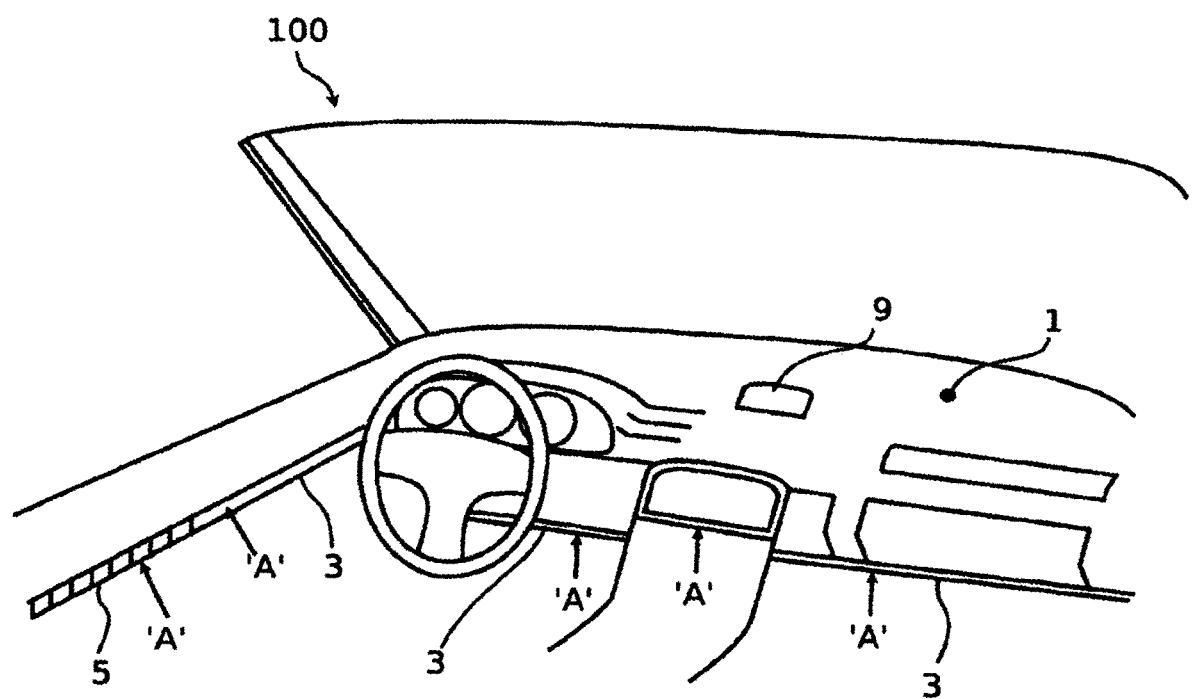

(51) Int. Cl.
*B60K 37/06* (2006.01)
*B60Q 3/78* (2017.01)

(56) References Cited

FOREIGN PATENT DOCUMENTS

| | | | | |
|---|---|---|---|---|
| DE | 102012220696 A1 | 5/2014 | | |
| DE | 102013009063 A1 | 12/2014 | | |
| DE | 102013226902 A1 * | 6/2015 | ............. | G08C 17/02 |
| DE | 102013226902 A1 | 6/2015 | | |
| DE | 102014215329 A1 | 2/2016 | | |
| DE | 102016210512 A1 | 6/2017 | | |
| DE | 102016005255 A1 | 11/2017 | | |
| DE | 202018102572 U1 | 5/2018 | | |
| EP | 2982541 A2 * | 2/2016 | ............. | B60K 37/06 |
| EP | 2982541 A2 | 2/2016 | | |

OTHER PUBLICATIONS

Office Action dated May 9, 2019 in related/corresponding DE Application No. 10 2018 005 476.5.
Written Opinion dated Sep. 19, 2019 in related/corresponding International Application No. PCT/EP2019/067134.

* cited by examiner

COLOR SELECTION FOR AMBIENT LIGHTING OF A VEHICLE

BACKGROUND AND SUMMARY OF THE INVENTION

Exemplary embodiments of the invention relate to a device for controlling ambient lighting of a vehicle, a vehicle having such a device, and a method for controlling ambient lighting of a vehicle.

DE 10 2016 005 255 A1 relates to a device for controlling an interior light of a vehicle, wherein the interior light has an array of several light sources for generating an interior light and/or a reading light.

Exemplary embodiments of the invention are directed to making the control of ambient lighting of a vehicle more intuitive.

A first aspect of the invention relates to a device for controlling ambient lighting of a vehicle. The device has a light element, a touch-sensitive display unit, and a control unit connected to the light element and the display unit. The light element is arranged in an interior of the vehicle and is designed to emit light in one of a plurality of colors which can be generated by the light element, wherein the touch-sensitive display unit is designed to display a plurality of colors of a predefined color spectrum simultaneously and arranged in a color scale, and further is designed to detect the location of a user input performed by touch on the display unit and, via the detected location, to assign the user input to an associated color displayed in the color scale, and to transmit information about the color assigned to the user input to the control unit. Finally, the control unit is designed to control the light element to emit light in the color assigned to the user input, wherein the light element and the touch-sensitive display unit have the same color space, such that the color assigned to the user input displayed on the touch-sensitive display unit and the color emitted thereupon by the light element are the same.

The vehicle can be a passenger car, lorry, bus, rail vehicle, water vehicle (for example, ship), underwater vehicle, or an aircraft.

The interior of the vehicle is in particular a passenger compartment, which in a closed vehicle forms an almost completely closed space, and in convertibles is limited by the body parts and the window panes.

The color space reflects the color reproduction of an objectively defined color value individually generated by the respective device (light element, touch-sensitive display unit). Thus, in the case of uncalibrated consumer devices, it can generally happen that two screens, which are controlled by the graphics unit of a processor with the same color values, output different actual color values. However, since the light element and the touch-sensitive display unit have the same color space, such an effect does not exist between the light element and the touch-sensitive display unit, in accordance with the invention.

In a preferred embodiment, the touch-sensitive display unit and the light element are arranged on a common surface. In this case, the plurality of colors of a predefined color spectrum is advantageously displayed locally when the user touches the touch-sensitive display unit, whereas when the user's touch is released, the ambient light is emitted again at the point of touch.

Preferably, the touch-sensitive display unit is a so-called "touch screen".

Preferably, all colors of the plurality of colors of the predefined color spectrum are arranged simultaneously and in a color scale and displayed in the colors and with the continuous color transitions of a rainbow.

In particular, a color spectrum is displayed in this embodiment starting from a short-wave blue range over waves increasing in length into a red range.

Preferably, the predefined color spectrum only contains those colors that can be physically emitted by the light element.

Particularly preferably, the set of colors from the predefined color spectrum is smaller than the set of colors which can be physically emitted by the light element and limited to an ergonomically reasonable selection of colors.

Further preferably, the light element has one or more light-emitting diodes. In particular, an additive color mixing of different single colors of the diodes takes place in order to be able to change (quasi) continuously between several desired colors.

Further preferably, the predefined color spectrum only has those colors that are in a spectral range visible to humans. This excludes, in particular, ultraviolet and infrared colors.

In particular, the location of the user input made by touching the touch-sensitive display unit and the displayed color scale overlap.

Preferably, a user input is only possible if the location of the user input made by touching the touch-sensitive display unit overlaps with the displayed color scale.

It is an advantageous effect of the invention that, without the use of rotary switches, knobs, toggle switches, or similar input devices, an intuitive selection of a desired color for ambient lighting for an interior of a vehicle occurs, in particular due to the fact that the colors of the selection on the display unit match those of the subsequent ambient lighting.

According to an advantageous embodiment, the color scale is designed as a color gradient with continuous transitions between individual colors.

The color gradient does not have any visible discretizations of colors, i.e., a visible limited number of colors. This is not contradicted by the fact that technically the spectrum of the color gradient can be discretized, but then preferably at such a high resolution that no gradations are visible to the human eye.

According to a further advantageous embodiment, the touch-sensitive display unit is integrated into an interior fitting of the vehicle. The term "integrated" is to be understood in this context as installed and arranged.

According to an advantageous embodiment, the touch-sensitive display unit and the light element are arranged in a common light strip and are connected to each other within the light strip. The light strip is in particular a component for accommodating the touch-sensitive display unit and the light element, wherein one dimension of the light strip is preferably larger than all other dimensions of the light strip, i.e., it forms an elongated body.

According to a further advantageous embodiment, the touch-sensitive display unit is a mobile terminal and the mobile terminal can be plugged into an interior fitting of the vehicle and, when plugged in, can be removed again from the interior fitting.

Preferably, the mobile terminal is one of: a tablet, laptop, smartphone, smartwatch.

For this purpose, a storage compartment is preferably provided in the interior of the vehicle, into which storage compartment the mobile terminal can be inserted and from which it can be removed again.

According to a further advantageous embodiment, the device further has a driver assistance screen connected to the control unit, wherein the driver assistance screen is designed to display the color assigned to the user input for a predetermined period of time in response to the user input. This preferably occurs by means of an animated depiction and/or in a symbol.

According to a further advantageous embodiment, the light element and the touch-sensitive display unit and the driver assistance screen have the same color space, such that the color assigned to the user input and displayed on the touch-sensitive display unit and the color emitted by the light element and the color displayed on the driver assistance screen are each the same in pairs.

According to a further advantageous embodiment, the light element is arranged on an inner side of a door of the vehicle and/or on a central console of the vehicle and/or on a dashboard of the vehicle.

A further aspect of the invention relates to a vehicle having a device as described above and below.

A further aspect of the invention relates to a method for controlling ambient lighting of a vehicle. The method has the following steps:

displaying a plurality of colors of a predefined color spectrum in a color scale by a touch-sensitive display unit, detecting the location of a user input made by touching the display unit and assigning the user input to a corresponding color displayed in the color scale via the detected location of the user input and transmitting information about the color assigned to the user input to a control unit, and controlling a light element by the control unit to emit light in the color assigned to the user input. In this case, the light element is arranged in an interior of the vehicle and is designed to emit light in one of a plurality of colors that can be generated by the light element. In addition, the light element and the display unit have the same color space, such that the color assigned to the user input and displayed on the touch-sensitive display unit and the color emitted by the light element are the same.

Preferably, a simultaneous display of a plurality of colors of a predefined color spectrum on a single color scale occurs by means of the touch-sensitive display unit.

Advantages and preferred developments of the proposed method emerge by means of an analogous and logical transference of the statements made above in connection with the proposed device.

Further advantages, features and details result from the following description, in which—if necessary with reference to the drawing—at least one exemplary embodiment is described in detail. Identical, similar and/or functionally identical parts are provided with identical reference numerals.

BRIEF DESCRIPTION OF THE DRAWING FIGURES

Figure 2:
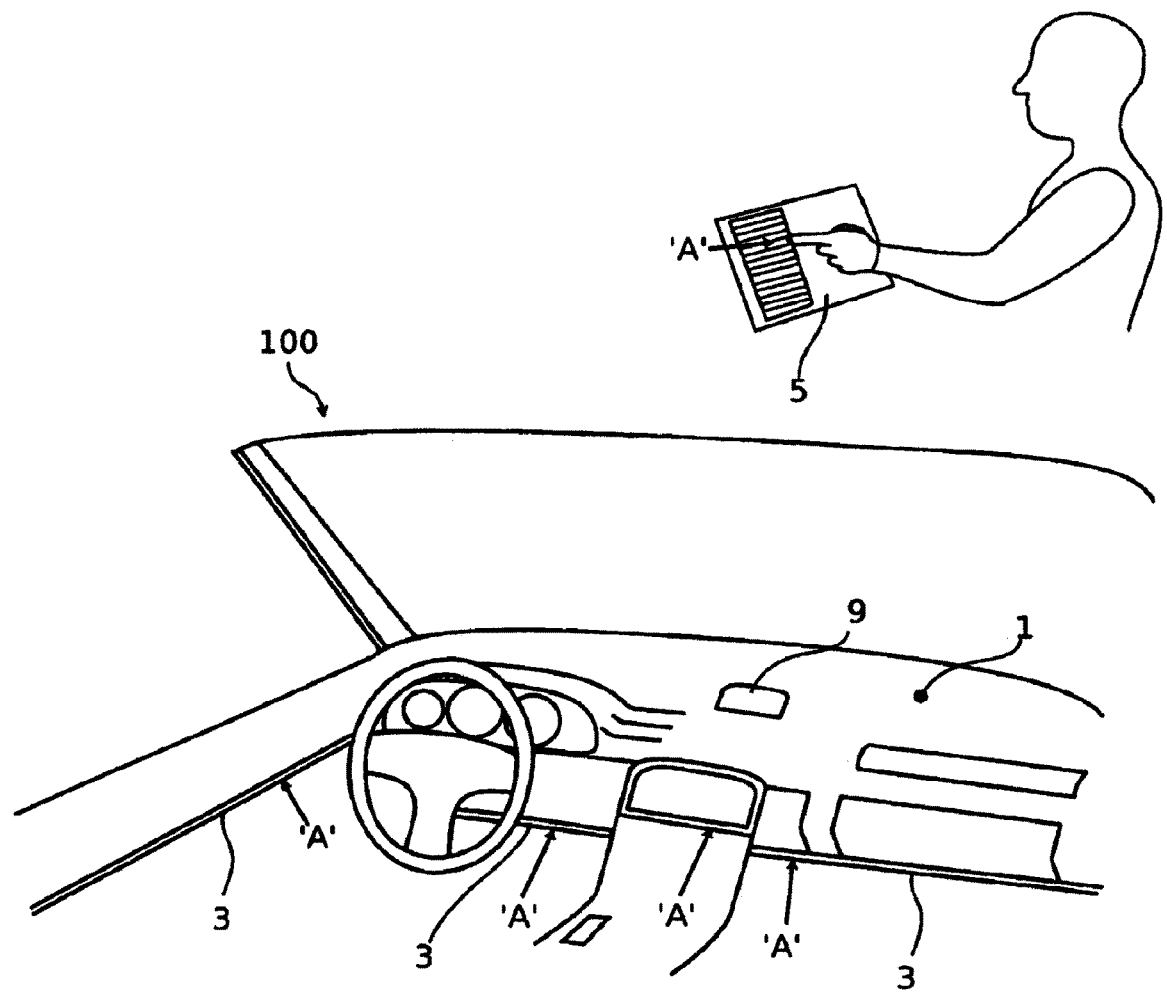
Figure 3:
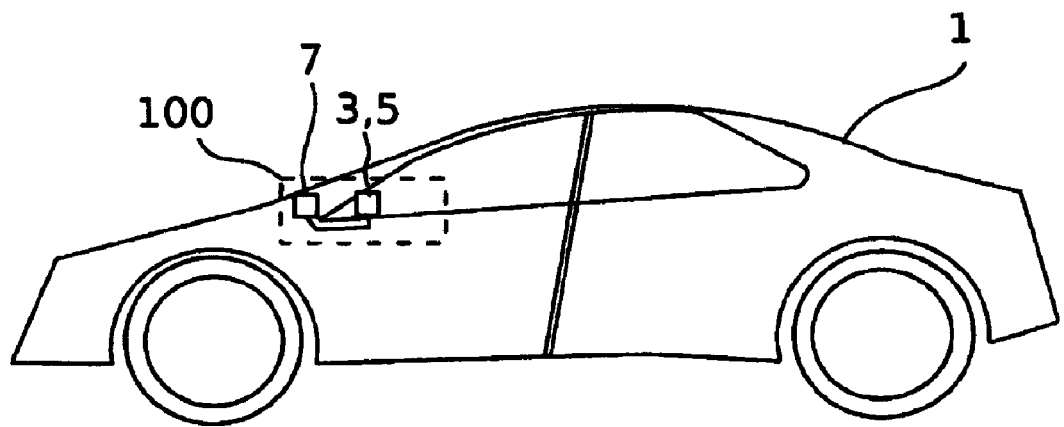
Figure 4:
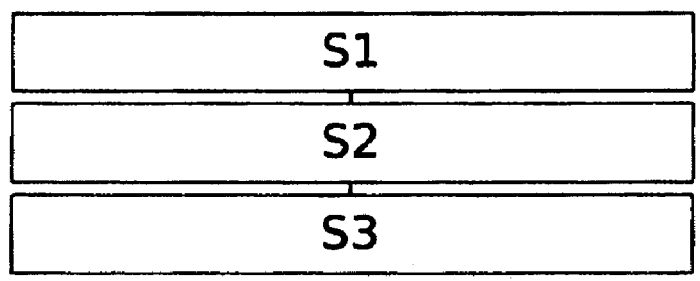

Here are shown:

FIG. 1 a device for controlling ambient lighting of a vehicle according to an exemplary embodiment of the invention, FIG. 2 a device for controlling ambient lighting of a vehicle according to a further exemplary embodiment of the invention, FIG. 3 a vehicle having a device in order to control ambient lighting of the vehicle according to a further exemplary embodiment of the invention, and FIG. 4 a method for controlling ambient lighting of a vehicle according to a further exemplary embodiment of the invention.

The depictions in the figures are schematic and not to scale.

DETAILED DESCRIPTION

FIG. 1 shows a device 100 for controlling ambient lighting of a vehicle 1, having a light element 3, a touch-sensitive display unit 5 and a control unit 7 connected to the light element 3 and to the display unit 5, wherein the light element 3 is arranged in an interior of the vehicle 1 and is designed to emit light in one of a plurality of colors that can be generated by the light element 3, wherein the touch-sensitive display unit 5 is designed to display a plurality of colors of a predefined color spectrum simultaneously and arranged in a color scale, and is designed to detect the location of a user input made by touching the display unit 5 and, via the detected location, to assign the user input to an associated color displayed in the color scale and to transmit information about the color assigned to the user input to the control unit 7.

The control unit 7 is designed to control the light element 3 to emit light in the color assigned to the user input, wherein the light element 3 and the display unit 5 have the same color space, such that the color assigned to the user input on the touch-sensitive display unit 5 and the color emitted by the light element 3 are the same. The color scale is designed as a color gradient with continuous transitions between the individual colors and is only depicted in FIG. 1 divided by vertical lines for better comprehensibility. On the color scale, the user selects a specific color 'A' from the displayed spectrum by touch or a correspondingly close gesture on the touch-sensitive display unit 5, and then light in the color 'A' is emitted from the light element 3. The display unit 5 and the light element 3 are also arranged in a common light strip of a driver door of the vehicle 1 and are connected to each other within the light strip, such that the light strip forms a physical frame common to the display unit 5 and the light element 3 and accommodates the display unit 5 and the light element 3.

Furthermore, the device 100 has a driver assistance screen 9 connected to the control unit 7, wherein the driver assistance screen 9 is designed to display the color assigned to the user input in response to the user input for a predetermined period of time. The driver assistance screen 9 also has the same color space as the light element 3 and the display unit 5, such that the color assigned to the user input displayed on the touch-sensitive display unit 5 and the color emitted by the light element 3 and the color displayed on the driver assistance screen 9 all appear the same for a user. Further sections of the light element 3 are arranged on an inner side of a door of the vehicle 1 and on a central console of the vehicle 1 and on a dashboard of the vehicle 1.

FIG. 2 shows a device 100 for controlling ambient lighting of a vehicle 1, having a light element 3, a touch-sensitive display unit 5 and a control unit 7 connected to the light element 3 and to the display unit 5, wherein the light element 3 is arranged in an interior of the vehicle 1 and is designed to emit light in one of a plurality of colors that can be generated by the light element 3, wherein the touch-sensitive display unit 5 is designed to display a plurality of colors of a predefined color spectrum simultaneously and arranged in a color scale, and is designed to detect the location of a user input made by touching the display unit 5 and, via the detected location, to assign the user input to an associated color displayed in the color scale and to transmit information about the color assigned to the user input to the control unit 7.

The control unit 7 is also designed to control the light element 3 to emit light in the color assigned to the user input, wherein the light element 3 and the display unit 5 have the same color space, such that the color assigned to the user input and displayed on the touch-sensitive display unit 5 and the color emitted by the light element 3 are the same. In turn, the color scale is designed as a color gradient with continuous transitions between individual colors. However, the touch-sensitive display unit 5 is a mobile terminal and the mobile terminal can be plugged into an interior of the vehicle 1 and, when plugged in, can be unplugged again from the interior. In FIG. 2, the mobile terminal is depicted in oversize for better comprehensibility during use by a user who is inputting the user data. For the mobile terminal, however, a storage unit is provided in the vehicle 1, into which the mobile terminal can be plugged. The user input of the user selects the color 'A' selected by a finger of the user on the touch-sensitive display unit 5, which, according to the above steps, leads to the color 'A' being emitted at the respective section of the light element 3. In turn, the control unit 7 is connected to a driver assistance screen 9, wherein the driver assistance screen 9 is designed to display the color associated with the user input in response to the user input for a period of three seconds after the user input.

The light element 3 and the display unit 5 and the driver assistance screen 9 in turn have the same color space, such that the color associated with the user input displayed on the touch-sensitive display unit 5 and the color emitted by the light element 3 and the color displayed on the driver assistance screen 9 are the same.

FIG. 3 shows a vehicle 1 having a device 100 either as described in FIG. 1 or in FIG. 2.

FIG. 4 shows a method for controlling ambient lighting of a vehicle 1, having the steps: displaying S1 a plurality of colors of a predefined color spectrum in a color scale by means of a touch-sensitive display unit 5, detecting S2 a location of a user input made by touch on the display unit 5 and assigning the user input to an associated color displayed in the color scale via the detected location of the user input, and transmitting information about the color assigned to the user input to a control unit 7, and controlling S3 a light element 3 by the control unit 7 for emitting light in the color associated with the user input, wherein the light element 3 is arranged in an interior of the vehicle 1 and is designed to emit light in one of a plurality of colors which can be generated by the light element 3, and wherein the light element 3 and the display unit 5 have the same color space, such that the color associated with the user input and displayed on the touch-sensitive display unit 5 and the color emitted by the light element 3 are the same.

Although the invention has been illustrated and explained in more detail by means of preferred exemplary embodiments, the invention is not limited by the disclosed examples, and other variations can be derived by the person skilled in the art without leaving the scope of protection of the invention. It is therefore clear that there is a plurality of variation possibilities. It is also clear that the embodiments mentioned by way of example really only depict examples which are not in any way understood as a limitation of the scope of protection, the possible applications or the configuration of the invention. Rather, the preceding description and the description of the figures enable the person skilled in the art to implement the exemplary embodiments in a concrete way, wherein the person skilled in the art, knowing the disclosed inventive idea, can make various changes, for example with respect to the function or the arrangement of individual elements mentioned in an exemplary embodiment, without leaving the scope of protection defined by the claims and their legal equivalents, such as further explanations in the description.

The invention claimed is:

1. A device for controlling ambient lighting of a vehicle, the device comprising:
    a light element arranged in an interior of the vehicle and configured to emit light in one of a plurality of colors that can be generated by the light element;
    a touch-sensitive display unit that simultaneously displays a plurality of colors of a predefined color spectrum in a color scale, detects a location of a user input made by touching the touch-sensitive display unit;
    a control unit connected to the light element and the touch-sensitive display unit; and
    a driver assistance screen connected to the control unit,
    wherein the touch-sensitive display unit, via the detected location of the user input, assigns the user input to an associated color displayed in the color scale and transmit information about the color assigned to the user input to the control unit,
    wherein the control unit controls the light element to emit light in the color assigned to the user input and controls the driver assistance screen to display, for a predetermined period of time, the color assigned to the user input, and
    wherein the light element, the driver assistance screen, and the touch-sensitive display unit have a same color space, such that the color associated with the user input, the color displayed on the touch-sensitive display unit, the color displayed by the driver assistance screen, and the color emitted by the light element are the same.

2. The device of claim 1, wherein the color scale is a color gradient with continuous transitions between individual colors.

3. The device of claim 1, wherein the touch-sensitive display unit is integrated into an interior fitting of the vehicle.

4. The device of claim 3, wherein the touch-sensitive display unit and the light element are arranged in a common light strip and adjoin each other within the common light strip.

5. The device of claim 1, wherein the touch-sensitive display unit is a mobile terminal and the mobile terminal is configured to be plugged into an interior fitting of the vehicle and, when plugged in, can be unplugged from the interior fitting again.

6. The device of claim 1, wherein the light element is arranged on an inner side of a door of the vehicle, on a central console of the vehicle, or on a dashboard of the vehicle.

7. A vehicle, comprising:
    an interior; and
    a device for controlling ambient lighting of a vehicle, the device comprising
    a light element arranged in the interior of the vehicle and configured to emit light in one of a plurality of colors that can be generated by the light element;
    a touch-sensitive display unit that simultaneously displays a plurality of colors of a predefined color spectrum in a color scale, detects a location of a user input made by touching the touch-sensitive display unit;
    a control unit connected to the light element and the touch-sensitive display unit; and a driver assistance screen connected to the control unit, wherein the touch-sensitive display unit, via the detected location of the user input, assigns the user input to an associated color displayed in the color scale and transmit information about the color assigned to the user input to the control unit, wherein the control unit controls the light element to emit light in the color assigned to the user input and controls the driver assistance screen to display, for a predetermined period of time, the color assigned to the user input, wherein the light element, the driver assistance screen, and the touch-sensitive display unit have a same color space, such that the color associated with the user input, the color displayed on the touch-sensitive display unit, the color displayed on the driver assistance screen, and the color emitted thereupon by the light element are the same.

8. A method for controlling ambient lighting of a vehicle, the method comprising:

displaying, a touch-sensitive display unit, a plurality of colors of a predefined color spectrum in a color scale;

detecting a location of a user input made by touch on the display unit, assigning the user input to an associated color displayed in the color scale via the detected location of the user input, and transmitting information about the color assigned to the user input to a control unit; and controlling, by the control unit, a light element and a driver assistance screen to emit light in the color associated with the user input in response to the user input, wherein the light element is arranged in an interior of the vehicle and emits light in one of a plurality of colors which can be generated by the light element, and wherein the light element, the touch-sensitive display unit, and the driver assistance screen have a same color space, such that the color associated with the user input, displayed on the touch-sensitive display unit, displayed on the driver assistance screen, and the color emitted by the light element are the same.

* * * * *